April 18, 1961    A. D. COGGESHALL ET AL    2,980,757
SPACING MEANS FOR ELECTRICAL DEVICES
Filed Nov. 20, 1959
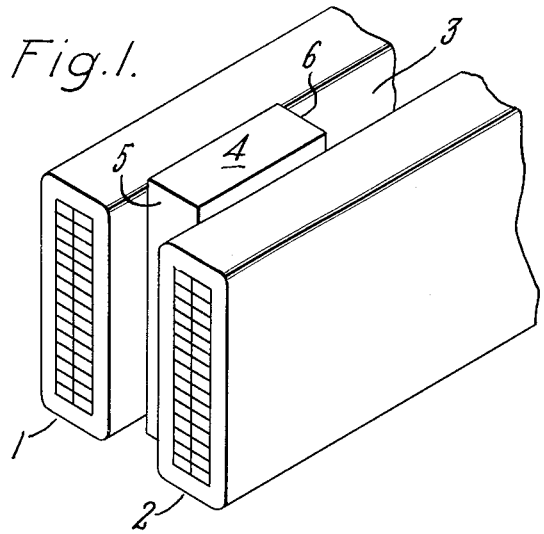
Fig.1.
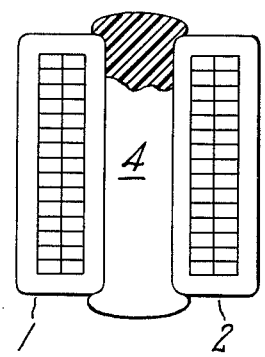
Fig.2.
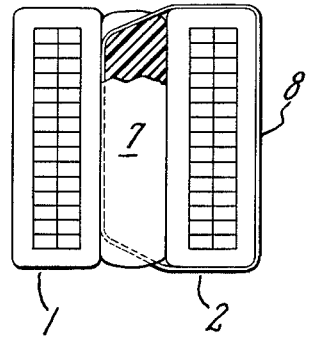
Fig.3.
INVENTORS
ALMY D. COGGESHALL
HAROLD R. SHIRK
THEIR ATTORNEY

United States Patent Office 2,980,757
Patented Apr. 18, 1961

2,980,757

SPACING MEANS FOR ELECTRICAL DEVICES

Almy D. Coggeshall and Harold R. Shirk, Schenectady, N.Y., assignors to General Electric Company, a corporation of New York Filed Nov. 20, 1959, Ser. No. 854,458

10 Claims. (Cl. 174—138)

This invention relates to electrical devices. More particularly, the invention relates to improved conformable means for blocking apart and restricting relative movement between conductor bars of electromagnetic devices such as motors, generators, transformers and the like for purposes, of cooling, proper alignment, or for binding such bars together into a rigid, physically strong structure. While the invention is described with particular reference to stator conductor bars and more particularly to the end winding portions of such stators, it will be understood that the invention applies as well to other electrical devices.

The stator conductor bars and the end winding portions of electrodynamic machines are subjected during operation of the machines to various electrically induced mechanical forces which tend to warp them out of shape and into contact one with the other, such forces being particularly aggravated during accidental short circuiting of the machines. To prevent such forces from either tearing the end winding portions of the conductor bars out of their connections and to prevent adjacent conductors from abrading and thus short-circuiting the machines, as well as for cooling purposes, it has been customary to space and restrict the movement of such conductor bars by the use of, for example, wooden blocks fitted between the bars and tied in place as with glass fiber, cord or string. The installation of such wooden blocks requires that the conductor bars be inserted in the machine, the spaces to receive the blocks measured, blocks of approximately suitable size selected, and then fitted individually. The bar must then be removed from the slot so that the blocks can be tied in place, the conductor bar then being replaced in the slot of the stator and the winding of the machine carried out to the next conductor bar. It is quite evident that this method is both tedious and economically unproductive. It will also be quite evident that the rigid blocks as of wood are incapable of taking up or closing any slack space which might inadvertently develop during the winding assembly procedure, so that despite ordinary care, the machine as completed may have a loosely fitted end winding portion which, under the forces experienced in actual operation, would become aggravated and could lead to early failure of the machine as a whole.

It has also been suggested in copending application Serial No. 818,879, fied June 8, 1959, assigned to the same assignee as this application, that slugs of resinous or thermosetting material encased in extensible sleeve material be inserted between the conductor bars, the sleeve then being extended to transversely constrict the sleeve and cause the originally rectangularly shaped slug of resin to deform to a cylindrical shape, thus pressing against and spacing the conductor bars. The ends of the sleeve are then passed around one of the bars to hold the spacer in shape. While methods such as the immediately preceding are advantageous in certain respects, the sleeving used is relatively expensive and the deformation of the resin slug by pulling on the ends of the sleeve rather difficult to carry out.

A principal object of this invention is to provide improved and simplified means for blocking apart and limiting the relative movement between conductor bars.

Briefly stated, the present invention relates to means for restricting the relative movement of conductor bars, said means comprising blocks of glass fiber-filled thermosetting resin, the glass fibers being oriented in substantially one direction. The blocks are placed between the conductor bars with two opposite sides of the blocks adjacent the respective sides of the bars and with the fiber orientation parallel to these sides of the bars taken longitudinally or transversely. The free sides of the blocks are then compressed perpendicular to the direction of orientation. This expands the block in a perpendicularly transverse direction whereby the block is forced against the conductors, conforming to the shape of the bars and spacing them in an elastic fashion. Upon curing the blocks, the bars are held in a rigid, spaced array.

Those features of the invention which are believed to be patentable are set forth with particularity in the claims appended hereto. The invention will, however, be better understood and further objects and advantages thereof, as well as its mode, be better appreciated from a consideration of the following description and the drawing, in which Fig. 1 represents a perspective view of two conductor bars with the present spacing means in place before compression, Fig. 2 is an end cross-sectional view of two conductor bars with the present spacing means compressed according to one embodiment of the invention, and Fig. 3 is similar to Fig. 2, except that the spacing means is that of another embodiment.

Any of the usual well-known thermosetting materials can be used in the practice of the invention, including but not limited to polyester resins and epoxy resins. The epoxy resins are well known in the art, and are typically prepared by reacting a material such as bisphenol-A and an epihalogenohydrin. Other typical epoxy resins are the epoxidized polyolefins, epoxidized glycerol type materials, and epoxidized cyclohexene type materials, among others. The polyesters which are useful in connection with this invention are the reaction product of polyhydric alcohols and polybasic acids. Preferably in order to provide a material which may be used without solvent, if desired, the polybasic acid is of the unsaturated type. Such unsaturated polyesters are well known in the art and are set forth, for example, in Patent 2,308,495, January 19, 1943, assigned to the same assignee as this application. Polyesters can, if desired, be modified by using a saturated aliphatic polycarboxylic acid as a part of the acidic ingredient and in other ways well known in the art.

The present resinous compositions contain from about 20 to 40 percent resin, 10 to 20 percent milled glass fibers, from about ¼ to 1 inch in length and from about 40 to 70 percent of finely divided mineral filler, such as calcium carbonate or other finely divided fillers well known to those skilled in the art. The preferable range of materials includes from about 20 to 25 percent resin, 10 to 15 percent glass fibers, and from about 60 to 70 percent finely divided mineral fillers. The specifically preferred composition includes about 22 percent resin, 11 percent milled glass fibers as above, and about 67 percent finely divided mineral fillers. If less than the specified amount of glass fibers are used, the final composition is characterized by deficient strength. On the other hand, if more than the requisite amount of glass fibrous material is used, the final composition tends to be too springy and will not form a suitably compact block. The mineral filler in the amounts specified serves to impart thixotropic characters to the material and to give it a putty-like or molding clay-like consistency.

In preparing the resinous material in suitable block form, the polyester resin along with the curing agent, such as benzoyl peroxide or tertiary butyl perbenzoate, and any of the usual anhydride, acid or amine-containing curing agents for the epoxy resins, and most preferably a material such as boron trifluoride, monoethylamine, which cures at reasonably low temperature, is extruded through a rectangular die of the proper shape and size for the particular structures which are to be spaced. It has unexpectedly been found that when a material so constituted is squeezed or subjected to pressure in any direction perpendicular to the glass fiber orientation or extrusion, the material readily deforms perpendicular to the direction of the extrusion with little or no deformation in the direction of the extrusion. Such material as described also is elastic in nature or has a memory so that if the space between conductor bars into which the blocks are placed and squeezed widens, the block will expand up to from about 3 percent to 5 percent of its thickness to adjust for such widening. This makes for a finely spaced structure or winding array at all times. It will at once be seen that such a material is admirably suited for the purpose at hand, that of spacing conductor bars. In order to accomplish this purpose, it is simply required that the shaped block of proper size be inserted between the conductor bars with the fibers parallel to the conductor bars. In many cases the block will remain in place by friction until squeezed or it may be held in place by hand or even tying where convenient. If the block is to be tied in place, it is preferably tied so that the glass fiber cords once again are parallel to the direction of the glass fiber orientation, such cords then cutting more readily into the block and more securely holding it in place. With the block in place between the conductor bars and held therebetween either by pressure fit, by reason of glass fiber or similar cords, or other means, the two free sides of the block parallel to the glass fiber orientation are squeezed in any suitable manner, for example, as by means of a pincer-like tool or by mechanical pressure exerted upon jaws, placed against said sides. As pointed out, when such pressure is applied, the block, which is of about the consistency of modeling clay or stiff putty, expands against the conductor bars, conforming to the shape thereof, and spacing them in a fixed manner. A particular advantage of the present invention is that the blocks need not be assembled in place until the entire end stator winding of the electrodynamic machine, for example, has been assembled. This is a definite advantage over the former wood block spacer system, in which the blocks first had to be fitted one by one and the bars removed from the slot to facilitate the tying of the blocks in place. If desired, the present blocks may be made so that they not only conform to the sides of the bars but also flow over the rounded ends of the bar to a certain degree, thus even more rigidly fixing themselves in place and eliminating without any question any need for tying in place with cords.

Referring to Fig. 1 of the drawing, there are shown in perspective view conductor bars 1 and 2 of the usual well-known type, defining a space 3 therebetween. In space 3 is a block 4 of the present resinous material, the glass fibers of which are preferably oriented in a vertical direction as shown, so that the conforming pressure may be more conveniently applied after a machine is assembled to the free sides 5 and 6. In some cases, of course, where the top and bottom of the block as shown are accessible, the orientation may be in the direction of sides 5 and 6, and the pressure applied to the top and bottom of the block. Shown in Fig. 2 is the block of Fig. 1 after the conforming pressure has been applied thereto. From Fig. 1, it will be noted that the block as shown projects slightly above and below the corresponding edges of the conductor bar, and hence when the conforming pressure is applied, not only does the material flow laterally against the sides of the respective conductor bars, but also bulges slightly up and over to conform partially with the upper periphery of the bars.

Shown in Fig. 3 is another embodiment of the invention in which the slug of resin 7 is originally not quite as long in a vertical direction as that shown in Figs. 1 and 2. When a snug fit is achieved with the unexpanded block, there is no need for the use of restraining or tying cord, such as of glass fiber. In some cases, the use of glass fiber or other suitable cord 8 is indicated. With the cord tightly tied in place, it tends to cut somewhat into the block and hold it rigidly in place. After the application of the expansive or conforming pressure to such a block of limited vertical length, the finished conforming spacer will have a shape and extent somewhat as that shown in Fig. 3.

When all of the spacer blocks are in place, the entire machine is placed in an oven and cured for a suitable length of time peculiar to the particular resin used and depending upon the heat resistance of the machine as a whole. Generally speaking, using epoxy type resins and $BF_3$-n-methylaniline or aniline complex type curing agents, temperatures of the order of about 80° C. for 16 to 24 hours are sufficient for curing. Using a polyester material known as Glaskyd 1901 manufactured by Perrysburg Laboratories and containing about 22 percent resin, 67 percent finely divided filler and 11 percent milled glass fibers ¼ inch to ½ inch long, a cure of about 8 hours at 80° C. is sufficient. The curing cycles of other suitable resins is well known. In general, materials which do not require curing temperatures of over about 100° C. are preferred.

There is provided, then, by the present invention means for spacing and restricting the relative movement of structural elements of electrical machinery. Such means are readily inserted in place and adjusted to fulfill their blocking and spacing function. They are furthermore possessed of a plastic memory which takes up any additional space which may develop during the assembly of the various parts which are to be spaced. When cured, the blocking and spacing means provide a rigid means for holding and spacing the structural elements in a unitary composite structure.

What we claim as new and desire to secure by Letters Patent of the United States is:

1. Means for restricting the relative movement of conductor bars, said means comprising blocks of glass fiber-filled thermosetting resin, said glass fibers being oriented in substantially one direction, said blocks being placed between said bars with the fiber orientation parallel to said bars and compressed at the free sides perpendicular to the direction of orientation to expand the blocks in a perpendicular transverse direction whereby the blocks conform to and space said bars.

2. Means for spacing conductor bars, said means comprising blocks of glass fiber-filled thermosetting material, said glass fibers being oriented in substantially one direction, said blocks being placed between said bars with the fiber orientation transversely parallel to the sides of said bars, said blocks extending beyond the sides of said bars and compressed at the free sides perpendicular to the direction of orientation to expand the blocks whereby the blocks conform to and space said bars.

3. Means for spacing conductor bars, said means comprising blocks of thermosetting material containing up to about 20 percent, by weight, of glass fiber oriented in substantially one direction, said blocks being positioned between said bars with the fiber orientation parallel thereto and so compressed that the block conforms to the shape of the bars.

4. Means for spacing conductor bars, said means comprising blocks of thermosetting material filled with from about 40 to 70 percent of finely divided mineral filler and from about 10 to 20 percent of milled glass fibers, said glass fibers being oriented in substantially one direction, said blocks being positioned between said bars with the fiber orientation parallel thereto and so compressed that the block conforms to the shape of the bars.

5. Means for spacing conductor bars, said means comprising blocks of thermosetting material containing from about 40 to 70 percent finely divided mineral filler and from about 10 to 20 percent milled glass fibers, said glass fibers being oriented in substantially one direction, said blocks being positioned between said bars with the fiber orientation parallel thereto and tied in place with cords, said block being so compressed that the block conforms to the shape of the bars.

6. Means for spacing conductor bars, said means comprising blocks of thermosetting material filled with from about 60 to 70 percent of finely divided mineral filler and from about 10 to 15 percent of milled glass fibers, said glass fibers being oriented in substantially one direction, said blocks being positioned between said bars with the fiber orientation parallel thereto and so compressed that the block conforms to the shape of the bars.

7. Means for spacing conductor bars, said means comprising blocks of thermosetting material filled with about 67 percent of finely divided mineral filler and about 11 percent of milled glass fibers, said glass fibers being oriented in substantially one direction, said blocks being positioned between said bars with the fiber orientation parallel thereto and so compressed that the block conforms to the shape of the bars.

8. The process of restricting the movement and maintaining the spacing of conductor bars which comprises placing between said bars blocks of thermosetting material containing up to about 20 percent, by weight, of glass fibers oriented in substantially one direction, said blocks being positioned between said bars with the fiber orientation parallel thereto and compressing the free sides of said blocks to cause said blocks to conform to the shape of the bars.

9. The process of restricting the movement and maintaining the spacing of conductor bars which comprises placing between said bars blocks of thermosetting material containing as filler from about 40 to 70 percent finely divided mineral filler and from about 10 to 20 percent of milled glass fibers, said fibers being oriented in substantially one direction, said blocks being positioned between said bars with the fiber orientation parallel thereto and compressing the free sides of said blocks to cause said blocks to conform to the shape of said bars.

10. A conductor array for an electrical device comprising conductor bars and means for restricting the relative movement of said conductor bars, said means comprising blocks of glass fiber-filled thermosetting resin, said glass fibers being oriented in substantially one direction, said blocks being placed between said bars with the fiber orientation parallel to said bars and compressed at the free sides perpendicular to the direction of orientation to expand the blocks in a perpendicular transverse direction whereby the blocks conform to and space said bars.

References Cited in the file of this patent

UNITED STATES PATENTS

| | | |
|---|---|---|
| 1,690,003 | Foerch | Oct. 30, 1928 |
| 2,368,505 | Weldon | Jan. 30, 1945 |
| 2,392,734 | Haberstump | Jan. 8, 1946 |
| 2,436,306 | Johnson | Feb. 17, 1948 |
| 2,602,829 | Fromm et al. | July 8, 1952 |
| 2,610,937 | Frink et al. | Sept. 16, 1952 |
| 2,677,067 | Johnson et al. | Apr. 27, 1954 |
| 2,774,900 | Acton et al. | Dec. 18, 1956 |
| 2,885,581 | Pileggi | May 5, 1959 |